United States Patent
Bhageria et al.

(10) Patent No.: US 10,904,287 B2
(45) Date of Patent: Jan. 26, 2021

(54) PROTECTING AGAINST NOTIFICATION BASED PHISHING ATTACKS

(71) Applicant: International Business Machines Corporation, Armonk, NY (US)

(72) Inventors: Gopal K. Bhageria, Kolkata (IN); Vijay Ekambaram, Tamilnadu (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/561,238

(22) Filed: Sep. 5, 2019

(65) Prior Publication Data
US 2019/0394236 A1    Dec. 26, 2019

Related U.S. Application Data

(63) Continuation of application No. 15/373,928, filed on Dec. 9, 2016, now Pat. No. 10,567,430.

(51) Int. Cl.
*H04L 29/06* (2006.01)

(52) U.S. Cl.
CPC ...... *H04L 63/1483* (2013.01); *H04L 63/1416* (2013.01)

(58) Field of Classification Search
CPC ................. H04L 63/1483; H04L 63/1416
(Continued)

(56) References Cited

U.S. PATENT DOCUMENTS 7,634,810 B2 * 12/2009 Goodman ........... H04L 63/1416
726/22
8,127,358 B1 * 2/2012 Lee ....................... G06F 21/564
726/22
(Continued)

FOREIGN PATENT DOCUMENTS

| WO | WO2010105184 A2 | 9/2010 |
|----|----|----|
| WO | WO2010110885 A1 | 9/2010 |
| WO | WO2015014299 A1 | 2/2015 |

OTHER PUBLICATIONS

Malisa et al., "Detecting Mobile Application Spoofing Attacks by Leveraging User Visual Similarity Perception", www.iacr.org, IACR Cryptology ePrint Archive, received Jul. 16, 2015, last revised Jan. 27, 2016, 17 pages.
(Continued)

*Primary Examiner* — Kambiz Zand
*Assistant Examiner* — Aubrey H Wyszynski
(74) *Attorney, Agent, or Firm* — Scully, Scott, Murphy & Presser, P.C.; Scott Dobson, Esq.

(57) ABSTRACT

A method, system and computer program product are disclosed for protecting against notification based phishing attacks on a computing device. In an embodiment, the method comprises when the computing device receives a notification, identifying a pattern for the notification and identifying an application that triggered the notification; determining if the identified pattern matches any of a defined group of pre-specified patterns, each of the pre-specified patterns being associated with a specified application; when the identified pattern matches one of the pre-specified patterns, determining if the specified application associated with the matched pattern is the same as the application that triggered the notification; and when the specified application associated with the matched pattern is not the same as the application that triggered the notification, generating a mes-
(Continued)

sage to alert a user of the computing device that the received notification may be a phishing attack.

20 Claims, 3 Drawing Sheets

(58) Field of Classification Search
USPC .......................................................... 726/23
See application file for complete search history.

(56) References Cited

U.S. PATENT DOCUMENTS

| 8,191,148 | B2 | 5/2012 | Oliver et al. |
| 8,291,495 | B1 * | 10/2012 | Burns ................. H04L 63/0254 726/23 |
| 8,578,480 | B2 * | 11/2013 | Judge ................. H04L 63/1466 726/22 |
| 8,677,495 | B1 * | 3/2014 | Yang ..................... G06F 21/552 726/24 |
| 8,683,585 | B1 * | 3/2014 | Chen ....................... G06F 21/56 726/22 |
| 9,363,280 | B1 | 6/2016 | Rivlin et al. |
| 10,127,379 | B2 | 11/2018 | Muttik |
| 10,567,430 | B2 * | 2/2020 | Bhageria ............. H04L 63/1416 |
| 2006/0294588 | A1 * | 12/2006 | Lahann ................... G06F 21/56 726/23 |
| 2007/0050848 | A1 | 3/2007 | Khalid |
| 2007/0136455 | A1 | 6/2007 | Lee et al. |
| 2008/0034428 | A1 | 2/2008 | Bejar et al. |
| 2009/0089859 | A1 * | 4/2009 | Cook .................. H04L 63/1441 726/3 |
| 2010/0281248 | A1 | 11/2010 | Lockhart et al. |
| 2011/0055925 | A1 | 3/2011 | Jakobsson |
| 2011/0185429 | A1 | 7/2011 | Sallam |
| 2013/0036468 | A1 | 2/2013 | Georgiev |
| 2014/0082726 | A1 | 3/2014 | Dreller et al. |
| 2014/0230050 | A1 | 8/2014 | Higbee et al. |
| 2014/0283076 | A1 | 9/2014 | Muttik |
| 2016/0099963 | A1 | 4/2016 | Mahaffrey et al. |
| 2017/0041309 | A1 | 2/2017 | Ekambaram et al. |
| 2018/0034778 | A1 * | 2/2018 | Ahuja ............... G06F 16/24568 |
| 2018/0034779 | A1 * | 2/2018 | Ahuja ............... G06F 16/90344 |
| 2018/0167411 | A1 * | 6/2018 | Bhageria ............. H04L 63/1483 |

OTHER PUBLICATIONS

Mörchen, "Unsupervised pattern mining from symbolic temporal data", SIGKDD Explorations, vol. 9, Issue 1, pp. 41-55, Jun. 2007.
Yan et al., "Pattern Mining Approach to Unsupervised Definition Extraction", 2012, The Association for Natural Language Processing, Mar. 2012, pp. 459-462.
Bird, "Android Notificationlistenerservice Example", http://kpbird.blogspot.com/2013/07/android-notiticationlisterservice.html, Jul. 31, 2013, last printed Mar. 21, 2016, pp. 1-9.
List of IBM Patents or Patent Applications Treated As Related.

* cited by examiner

| App-Signature | Notification Pattern Representation |
|---|---|
| Com.X.X.Facebook | <FB-Pattern> Ex. {V1,v6,v9} |
| Com.Q.R.Twitter | <Twitter-Pattern> Ex. {B1,B8,B3...} |

NPP-CHECK TABLE

PROTECTING AGAINST NOTIFICATION BASED PHISHING ATTACKS

CROSS REFERENCE TO RELATED APPLICATION

This application is a continuation of copending U.S. patent application Ser. No. 15/373,928, filed Dec. 9, 2016, the entire contents and disclosure of which are hereby incorporated herein by reference.

BACKGROUND

This invention generally relates to computer security, and more particularly to protecting against notification based phishing attacks.

The Internet has significantly and dramatically changed the way people live and communicate. The internet gives users access to a vast number of resources from locations around the world. In addition, the Internet allows users to perform commercial transactions and share private and sensitive information. A significant concern when browsing the Internet is the vulnerability of the equipment, the data, and the information to attacks from malicious individuals or organizations. Thus, the security of the equipment and information is an important challenge.

One type of fraudulent act over the Internet is known as phishing, which has become one of the fastest growing online threats. In the last few years, there have been significant increases in the number of phishing attacks over the Internet, and thus users are now looking for effective ways for blocking such attacks.

Phishing refers to an attempt to fraudulently retrieve sensitive information, such as bank account information, social security numbers, passwords, and credit card information, by masquerading as a trustworthy person or business with a proper need for such information.

In a phishing attack, an individual receives a message, commonly in the form of an e-mail directing the individual to perform an action, such as opening an e-mail attachment or following (e.g., using a cursor controlled device or touch screen) an embedded link. If such message were from a trusted source (e.g., a co-worker, a known bank or utility company), then such action might carry little risk. In a phishing attack, such message is from an attacker (e.g., an individual using a computing device to perform a malicious act on another computer device user) disguised as a trusted source, and an unsuspecting individual, for example, opening an attachment to view a "friend's photograph" might in fact install malicious computer software (i.e., spyware, a virus, and/or other malware) on his or her computer. Similarly, an unsuspecting individual directed to a webpage made to look like an authentic login or authentication webpage might be deceived into submitting his or her username, password or other sensitive information to an attacker.

One particular type of phishing attack is notification based phishing. Notifications are short messages sent to computer devices to inform the user that an update is available to an application on the computing device. These short messages are sometimes referred to as pop-up messages or pop-ups. When the user clicks on, or activates, the notification, the application that triggered the notification is opened. For example, a user may receive a notification on a mobile phone from a social website, and when the user clicks on the notification, the application for that web site opens on the mobile phone.

Due to the near constant availability and very frequent use of mobile computing devices, notifications are particularly common on mobile computing devices.

In notification based phishing, a malicious application on a computing device will trigger a notification that is a near exact copy of a notification from a legitimate application. When the user clicks on the malicious notification, the malicious application opens up a log-in screen on the computing device that is a near exact copy of a log-in screen from a legitimate web site. Because the notification and screen are such near exact copies as those from valid enterprises, the user is fooled into thinking the screen is legitimate and hence secure.

The user could enter his or her credentials on the fake log-in screen. When the user clicks on the log-in button, the malicious application sends the credentials to the legitimate web site along with a request to open the legitimate application on the computing device. The legitimate website then opens its application on the user's computing device. The malicious application now has the use's credentials for this website, and the user is not even aware of this.

There are computer programs that prevent, guard against, or detect generic application phishing. These programs, however, tend to have important limitations.

SUMMARY

Embodiments of the invention provide a method, system and computer program product for protecting against notification based phishing attacks on a computing device. In an embodiment, the method comprises, when the computing device receives a notification, identifying a pattern for the notification and identifying an application that triggered the notification; and determining if the identified pattern matches any of a defined group of pre-specified patterns, each of the pre-specified patterns being associated with a specified application. When the identified pattern matches one of the pre-specified patterns, a check is made to determine if the specified application associated with the matched pattern is the same as the application that triggered the notification. When the specified application associated with the matched pattern is not the same as the application that triggered the notification, a message is generated to alert a user of the computing device that the received notification may be a phishing attack.

Embodiments of the invention provide an application for a computing device that can detect notification based phishing attacks for all applications on the computing device without having any dependency on operating system customizations or application indicators.

Embodiments of the invention do not require any operating system changes, and are not restricted to only certain applications which follow a high level of security like application indicators. Embodiments of the invention can detect notification based phishing attacks for all applications in a computing device irrespective of whether they support a high level of security or not.

As discussed above, notification phishing is a particularly serious issue with mobile computing devices. The scale of this problem is greatly magnified with wearable computing devices. Notifications are very commonly used in wearable devices (like watches, glasses, etc.). Since the display size is very small, phishing notification attacks are very easy in wearable computing devices.

There are frameworks which synchronize a user's mobile device with a smart watch and renders notifications in the smart watch if the notification messages are received in the mobile device. Also, there are frameworks which could send an intent to open an application in the mobile device by interacting with a notification in the smart watch.

DETAILED DESCRIPTION

Figure 1:
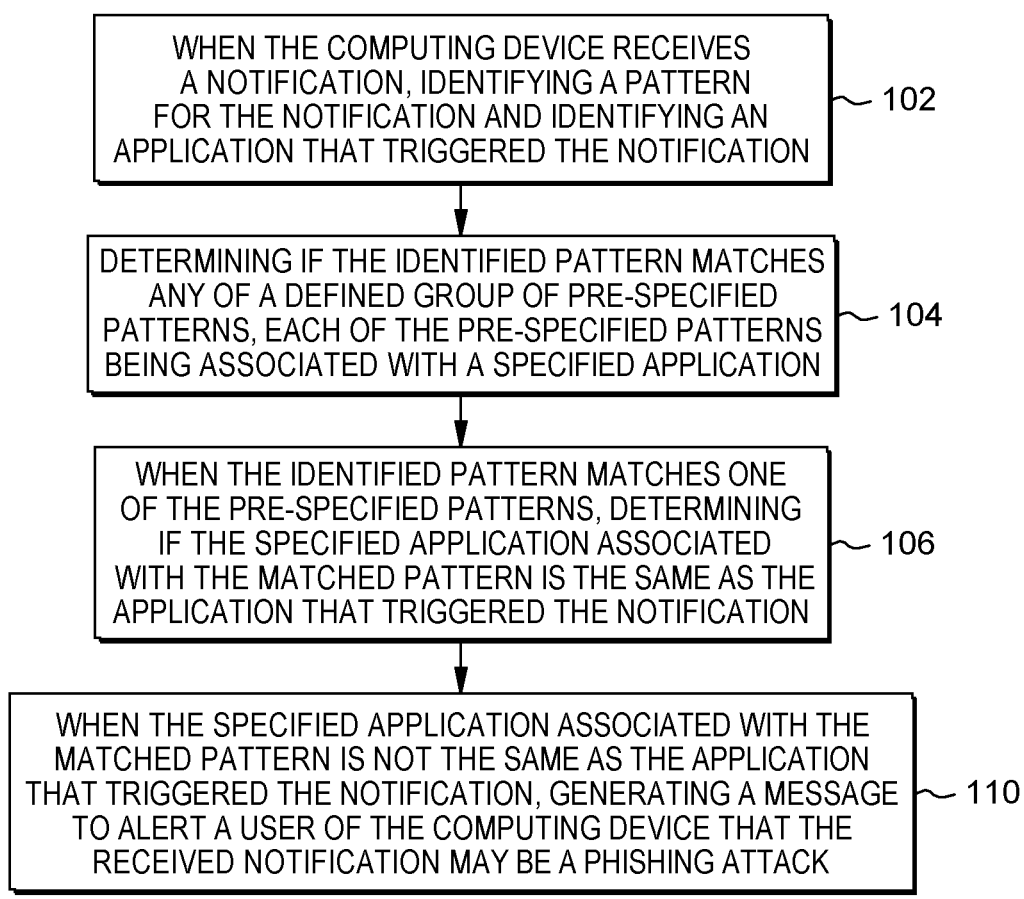
FIG. 1 illustrates a method in accordance with an embodiment of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention provide a method, system and computer program product for protecting against notification based phishing attacks on a computing device. As mentioned above, in notification based phishing, a malicious application on a computing device will trigger a notification that is a near exact copy of a notification from a legitimate application. When the user clicks on the malicious notification, the malicious application opens up a log-in screen on the computing device that is a near exact copy of a log-in screen from a legitimate web site. Because the notification and screen are such near exact copies as those from valid enterprises, the user is fooled into thinking the screen is legitimate and hence secure.

The user could enter his or her credentials on the fake log-in screen. When the user clicks on the log-in button, the malicious application sends the credentials to the legitimate web site along with a request to open the legitimate application on the computing device. The legitimate website then opens its application on the user's computing device. The malicious application now has the use's credentials for this website, and the user is not even aware of this.

There are computer programs that prevent, guard against, or detect generic application phishing. These programs, however, tend to have important limitations. For instance, some common techniques to prevent application-fishing require the use of application indictors. Some widely used social media web sites do not support application indicators, though, as it requires users to do an extra level of initial hand-shake, which users may not prefer.

Some designs to prevent notification based phishing use a semi-operating system controlled notification view. The view includes an operating system-controlled frame, and an application-controlled subview. Control of the subview can be given to a sender application, but the sender application cannot modify the content in the operating system-controlled frame. This approach demands operating system customizations and thus has practical limitations.

Embodiments of the invention provide an application for a computing device that can detect notification based phishing attacks for all applications on the computing device without having any dependency on operating system customizations or application indicators.

FIG. 1 illustrates a method in accordance with an embodiment of the invention. In this embodiment, at 102, when the computing device receives a notification, a pattern is identified for the notification and an application that triggered the notification is identified. At 104, a determination is made if the identified pattern matches any of a defined group of pre-specified patterns, each of the pre-specified patterns being associated with a specified application. When the identified pattern matches one of the pre-specified patterns, a check is made, at 106, to determine if the specified application associated with the matched pattern is the same as the application that triggered the notification. When the specified application associated with the matched pattern is not the same as the application that triggered the notification, a message is generated, at 110, to alert a user of the computing device that the received notification may be a phishing attack.

Embodiments of the invention are very well suited for use with mobile computing devices such as smartphones and with wearable computing devices such as smart watches. As will be understood be those of ordinary skill in the art, embodiments of the invention can also be used with other types of computing devices such as laptop computer, personal computer and workstations.

Figures 2, 3:
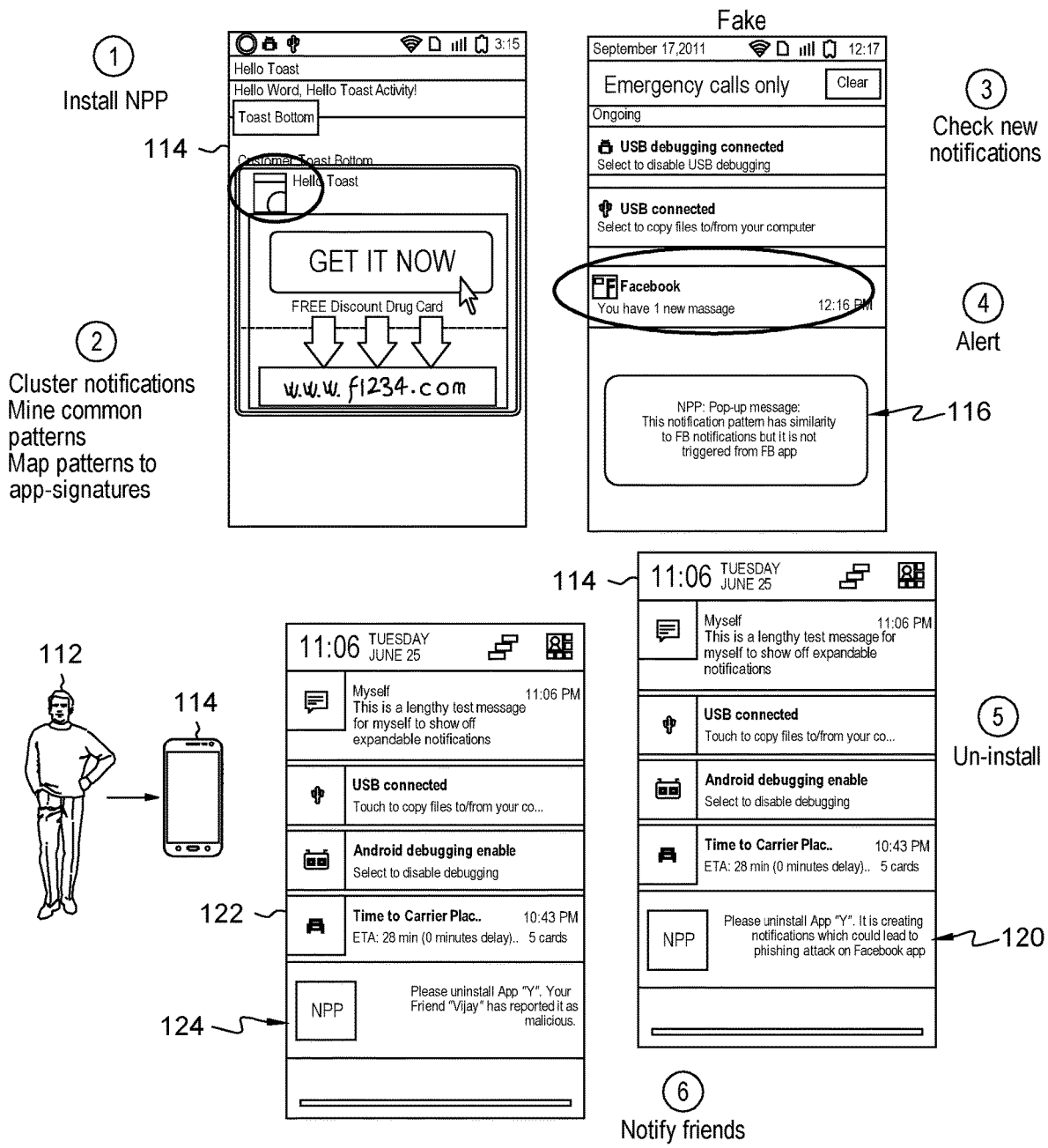
FIG. 2 shows a more detailed method and system according to an embodiment of the invention.
FIG. 3 shows a check-table that may be used in an embodiment of the invention.

FIGS. 2 and 3 illustrate a more detailed example of an embodiment of the invention. In this embodiment, at step-1, a user 112 installs an application referred to as the NPP (Notification Phishing Prevention) application, in a mobile device 114. The NPP application registers to notification listeners of the mobile device operating system. Using suitable techniques, the NPP reads the notifications received in the mobile device. Techniques for reading received notifications are known in the art.

Step-2 of FIG. 2 is to cluster notifications, mine common patterns, and map patterns to app-signatures. More specifically, the NPP clusters notifications from the same application signature (i.e., some unique identification of the application, which could, for example, be an application package name which is unique in playstore) using unsupervised pattern matching techniques. Then the NPP mines common patterns in these clustered notifications of the same application signature using unsupervised pattern mining techniques. Many unsupervised pattern mining techniques exist. Using these, common patterns can be extracted from a set of data without specifying any rules (i.e., unsupervised techniques).

These common patterns could be notification-icon image patterns, notification-title patterns, notification-view formats, etc. There could be many patterns. The NPP can detect all of these patterns as the NPP follows unsupervised mining techniques. The NPP maps these mined patterns to the application signature of the application and stores the patterns in an NPP-CHECK TABLE. An example NPP-CHECK TABLE is shown in FIG. 3.

The NPP keeps building these patterns in a continuous fashion such that the system evolves over time to an acceptable accuracy—that is, the patterns are mapped to the correct application.

At step-3 of FIG. 2, the NPP checks new notifications. As indicated above, the NPP registers to the notification listener, which triggers a NPP notification check whenever a new notification is received by the mobile computing device. When a new notification is received, the NPP checks whether the new notification matches any pattern in the NPP-CHECK TABLE. If the new notification matches a pattern, the NPP retrieves the app-signature of the matching pattern. If the new notification does not match any pattern in the table, the NPP executes step-2 to mine a pattern for the new notification and creates a new entry in the NPP-CHECK TABLE once the pattern is mined to an acceptable confidence level.

If the app-signature retrieved from the NPP-CHECK Table in step-3 does not match with the app-signature of the application which triggered the notification, then, at step-4, the NPP shows a pop-up message 116 to the user that there is a possibility of a phishing attack. In embodiments of the invention, the NPP also informs the user of the application to which the notification pattern matches. For example, based on the app-ratings in play-store, NPP determines which application to label as malicious versus trusted. For example, if application A and application B are generating the same patterns of notifications, then, since B has a greater number of user ratings, application B will be considered as trusted and application A will be labeled as malicious. However, both applications will be displayed to the user for his final confirmation.

In embodiments of the invention, the NPP, at step-5, will also create a new notification 120 which will suggest to the user to un-install the application which triggered a notification for a phishing attack. The user could uninstall the malicious application by clicking on this constructed notification. The constructed notification, when clicked, opens the setting activity of the operating system of the mobile device to uninstall the malicious application. Once the user clicks on the constructed uninstall notification, the NPP confirms that the detected application is malicious, and the NPP then triggers a silent or a user permission based uninstall of the reported malicious application.

In embodiments of the invention, if a user has confirmed in step-5 that the application is a malicious application, by clicking the uninstall notification, the NPP, at step-6, sends information about this detected phishing application to other NPP instances on other mobile devices 122 identified via the user or the user's mobile device. For example, this information may be sent to a group of people who are identified as friends of the user via social media.

When, the mobile device of a friend of the user receives this notification, the NPP installed in that friend's mobile device analyzes this notification information and, if the malicious application is installed in the friend's mobile device, will suggest uninstallation of the application which was reported by his friend as malicious. In embodiments of the invention, this uninstall app notification 124 will identify the name of the friend whose device reported the threat.

Figure 4:
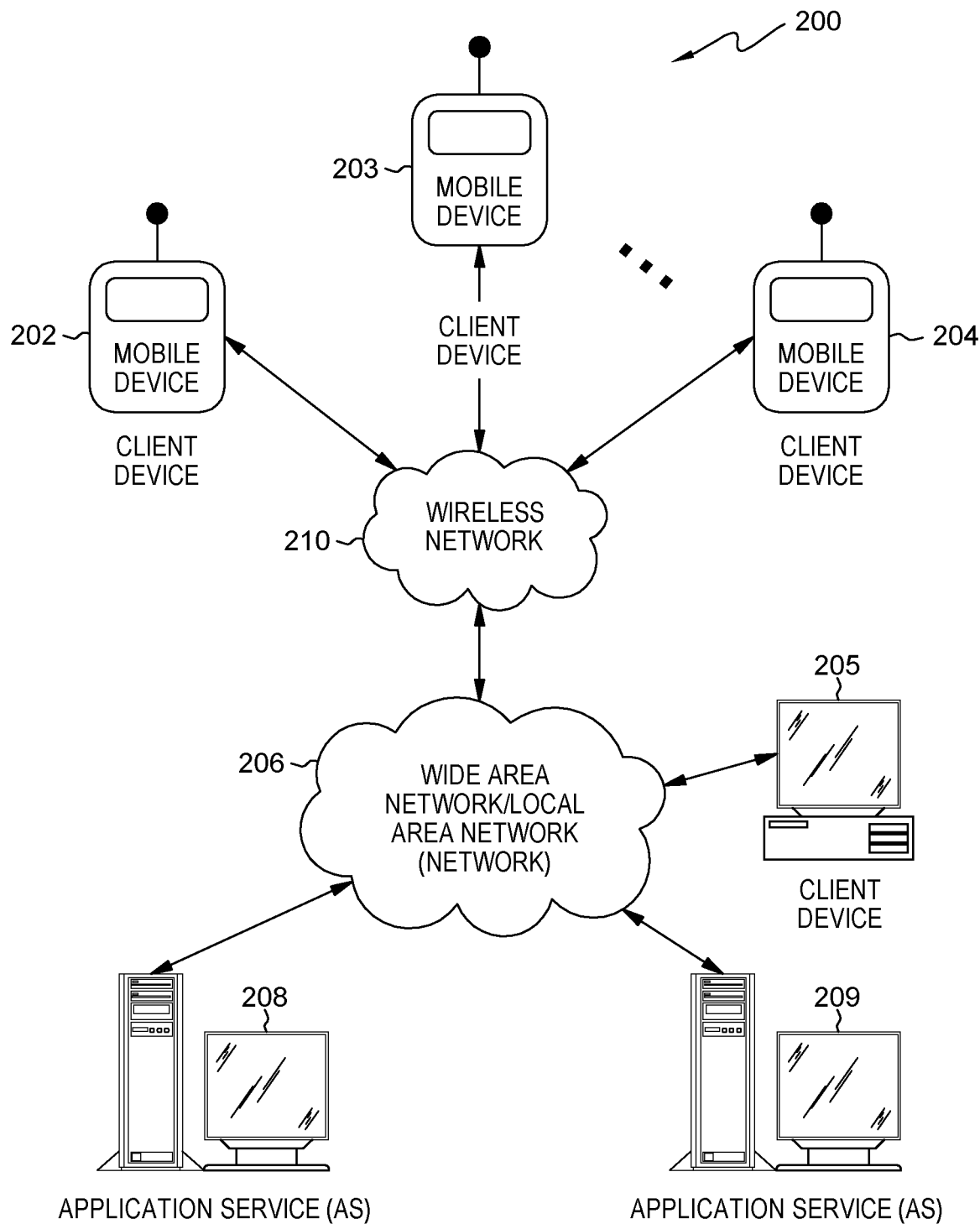
FIG. 4 shows a computer network environment that may be used to implement embodiments of the invention.

FIG. 4 shows components of an exemplary environment 200 in which the invention may be practiced. Not all the illustrated components may be required to practice the invention, and variations in the arrangement and type of the components may be made without departing from the spirit or scope of the invention. As shown, system 200 of FIG. 4 includes local area networks ("LANs")/wide area network 206, wireless network 210, mobile devices 202-204, client device 205, and application services (AS) 208-209.

Generally, mobile devices 202-204 may include virtually any portable computing device that is capable of receiving and sending a message over a network, such as networks 206 and wireless network 210. Such devices include portable devices, such as cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 202-204 typically range widely in terms of capabilities and features.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 202-204 may each receive messages sent from AS 208-209, from one of the other mobile devices 202-204, or even from another computing device. Mobile devices 202-204 may also send messages to one of AS 208-209, to other mobile devices, or to client device 205, or the like. Mobile devices 202-204 may also communicate with non-mobile client devices, such as client device 205, or the like.

Wireless network 210 is configured to couple mobile devices 202-204 and its components with network 206. Wireless network 210 may include any of a variety of wireless sub-networks that may further overlay stand-alone ad-hoc networks, and the like, to provide an infrastructure-oriented connection for mobile devices 202-204. Such sub-networks may include mesh networks, Wireless LAN (WLAN) networks, cellular networks, and the like.

Network 206 is enabled to employ any form of computer readable media for communicating information from one electronic device to another. Also, network 206 can include the Internet in addition to local area networks (LANs), wide area networks (WANs), direct connections, such as through a universal serial bus (USB) port, other forms of computer-readable media, or any combination thereof.

AS 208-209 include virtually any device that may be configured to provide an application service. Such application services or simply applications include, but are not limited to, email applications, search applications, video applications, audio applications, graphic applications, social networking applications, text message applications, or the like. In one embodiment, AS 208-209 may operate as a web server. However, AS 308-309 are not limited to web servers.

Those of ordinary skill in the art will appreciate that the architecture and hardware depicted in FIG. 4 may vary.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method of protecting against notification based phishing attacks on a computing device, the method comprising:
storing a plurality of notification patterns in a check-table, each of the notification patterns being associated with notifications received from one of a plurality of applications on the computing device, including
clustering the notifications from the plurality of the applications on the computing device,
mining common patterns in the clustered notifications,
mapping the common patterns to the plurality of applications on the computing device,
storing the common patterns in the check-table, and
for each of the common patterns in the check-table, identifying in the check-table one of the plurality of applications on the computing device;
when the computing device receives a new notification triggered by an application, checking whether the new notification matches any of the patterns in the check-table, including identifying a pattern for the new notification, and checking the check-table to determine whether the pattern for the new notification matches any of the patterns in the check-table;

when the pattern for the new notification matches one of the patterns in the check-table, determining if the application that triggered the new notification is the same as the application identified in the check-table for the matched pattern; and when the pattern for the new notification does not match any of the patterns in the check-table, mining a new pattern for the new notification.

2. The method according to claim 1, wherein the clustering the notifications from the plurality of the applications on the computing device includes clustering the notifications from the same application.

3. The method according to claim 1, wherein each of the applications on the computing device has an associated signature, and the clustering the notifications from the plurality of the applications on the computing device includes clustering the notifications from the ones of the applications having the same signature.

4. The method according to claim 1, wherein the checking the check-table to determine whether the pattern for the new notification matches any of the patterns in the check-table includes triggering a notification check whenever a new notification is received by the computing device.

5. The method according to claim 1, wherein the mining common patterns in the clustered notifications includes using unsupervised pattern mining techniques to mine said common patterns.

6. The method according to claim 1, wherein the common patterns are notification-icon image patterns.

7. The method according to claim 1, wherein the common patterns are notification-title patterns.

8. The method according to claim 1, wherein the common patterns are notification-view formats.

9. The method according to claim 1, further comprising when the pattern for the new notification matches one of the patterns in the check-table, and the application that triggered the new notification is not the same as the application identified in the check-table for the matched pattern, generating a message to alert a user of the computing device that the received notification may be a phishing attack.

10. The method according to claim 9, further comprising when the pattern for the new notification matches one of the patterns in the check-table, and the application that triggered the new notification is not the same as the application identified in the check-table for the matched pattern, uninstalling from the computing device the application that triggered the new notification.

11. A system for protecting against notification based phishing attacks on a computing device, the system comprising:
one or more processing units; and
memory including computer program instructions that, when executed by the one or more processing units, cause the system to perform the steps of:
storing a plurality of notification patterns in a check-table, each of the notification patterns being associated with notifications received from one of a plurality of applications on the computing device, including
clustering the notifications from the plurality of the applications on the computing device,
mining common patterns in the clustered notifications,
mapping the common patterns to the plurality of applications on the computing device,
storing the common patterns in the check-table, and
for each of the common patterns in the check-table, identifying in the check-table one of the plurality of applications on the computing device;
when the computing device receives a new notification triggered by an application, checking whether the new notification matches any of the patterns in the check-table, including identifying a pattern for the new notification, and checking the check-table to determine whether the pattern for the new notification matches any of the patterns in the check-table;
when the pattern for the new notification matches one of the patterns in the check-table, determining if the application that triggered the new notification is the same as the application identified in the check-table for the matched pattern; and
when the pattern for the new notification does not match any of the patterns in the check-table, mining a new pattern for the new notification.

12. The system according to claim 11, wherein the clustering the notifications from the plurality of the applications on the computing device includes clustering the notifications from the same application.

13. The system according to claim 11, wherein each of the applications on the computing device has an associated signature, and the clustering the notifications from the plurality of the applications on the computing device includes clustering the notifications from the ones of the applications having the same signature.

14. The system according to claim 11, wherein the checking the check-table to determine whether the pattern for the new notification matches any of the patterns in the check-table includes triggering a notification check whenever a new notification is received by the computing device.

15. The system according to claim 11, wherein the mining common patterns in the clustered notifications includes using unsupervised pattern mining techniques to mine said common patterns.

16. A computer program product for protecting against notification based phishing attacks on a computing device, the computer program product comprising:
a computer readable storage medium having program instructions embodied therein, the program instructions executable by one or more processing units to cause the one or more processing units to:
storing a plurality of notification patterns in a check-table, each of the notification patterns being associated with notifications received from one of a plurality of applications on the computing device, including
clustering the notifications from the plurality of the applications on the computing device,
mining common patterns in the clustered notifications,
mapping the common patterns to the plurality of applications on the computing device,
storing the common patterns in the check-table, and
for each of the common patterns in the check-table, identifying in the check-table one of the plurality of applications on the computing device;
when the computing device receives a new notification triggered by an application, checking whether the new notification matches any of the patterns in the check-table, including identifying a pattern for the new notification, and checking the check-table to determine whether the pattern for the new notification matches any of the patterns in the check-table;

when the pattern for the new notification matches one of the patterns in the check-table, determining if the application that triggered the new notification is the same as the application identified in the check-table for the matched pattern; and when the pattern for the new notification does not match any of the patterns in the check-table, mining a new pattern for the new notification.

17. The computer program product according to claim 16, wherein the clustering the notifications from the plurality of the applications on the computing device includes clustering the notifications from the same application.

18. The computer program product according to claim 16, wherein each of the applications on the computing device has an associated signature, and the clustering the notifications from the plurality of the applications on the computing device includes clustering the notifications from the ones of the applications having the same signature.

19. The computer program product according to claim 16, wherein the checking the check-table to determine whether the pattern for the new notification matches any of the patterns in the check-table includes triggering a notification check whenever a new notification is received by the computing device.

20. The computer program product according to claim 16, wherein the mining common patterns in the clustered notifications includes using unsupervised pattern mining techniques to mine said common patterns.

\* \* \* \* \*